M. J. HUGGINS.
AUTOMOBILE SPEED CONTROL MECHANISM.
APPLICATION FILED MAR. 19, 1917.
1,357,563.
Patented Nov. 2, 1920.
2 SHEETS—SHEET 1.
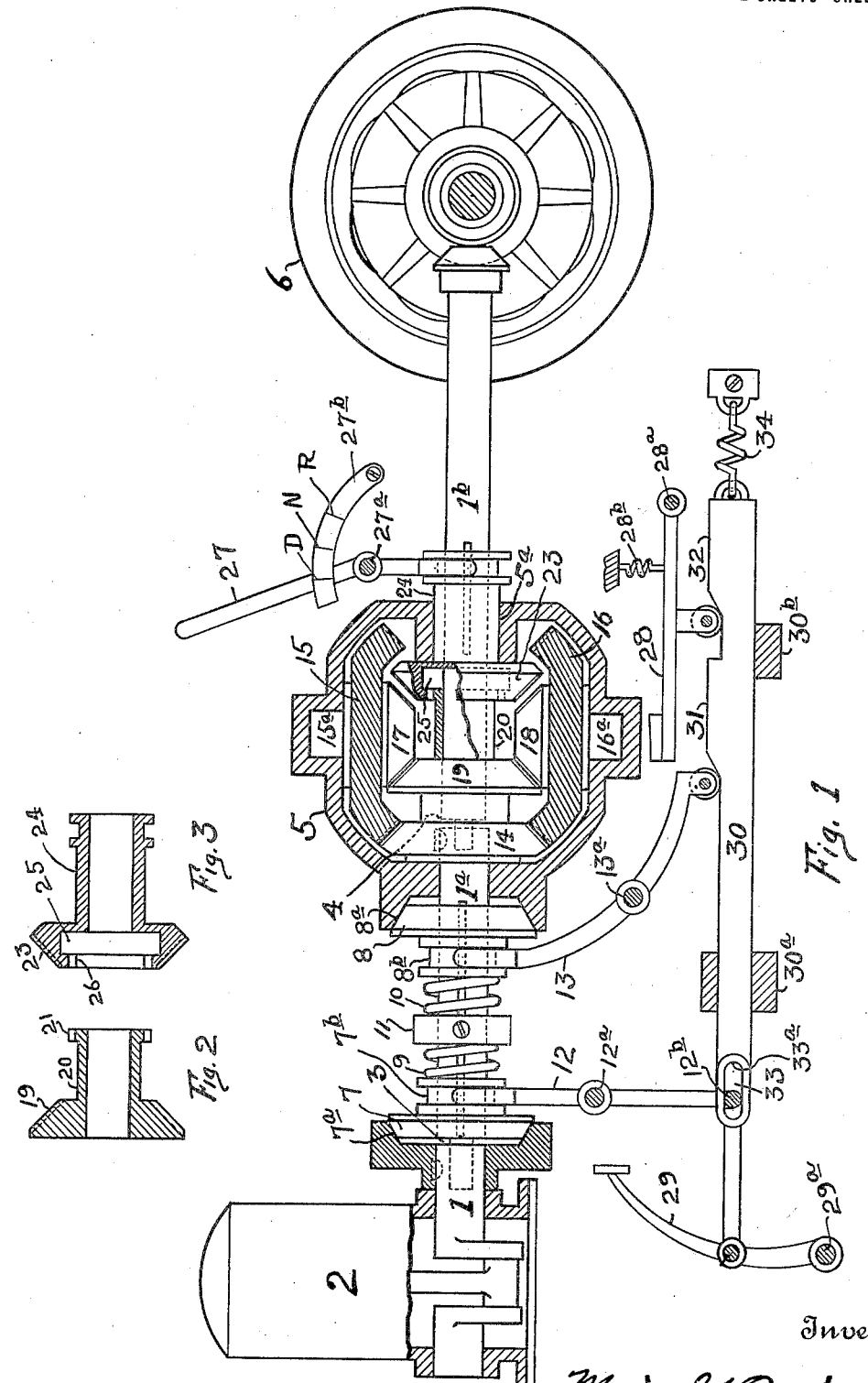

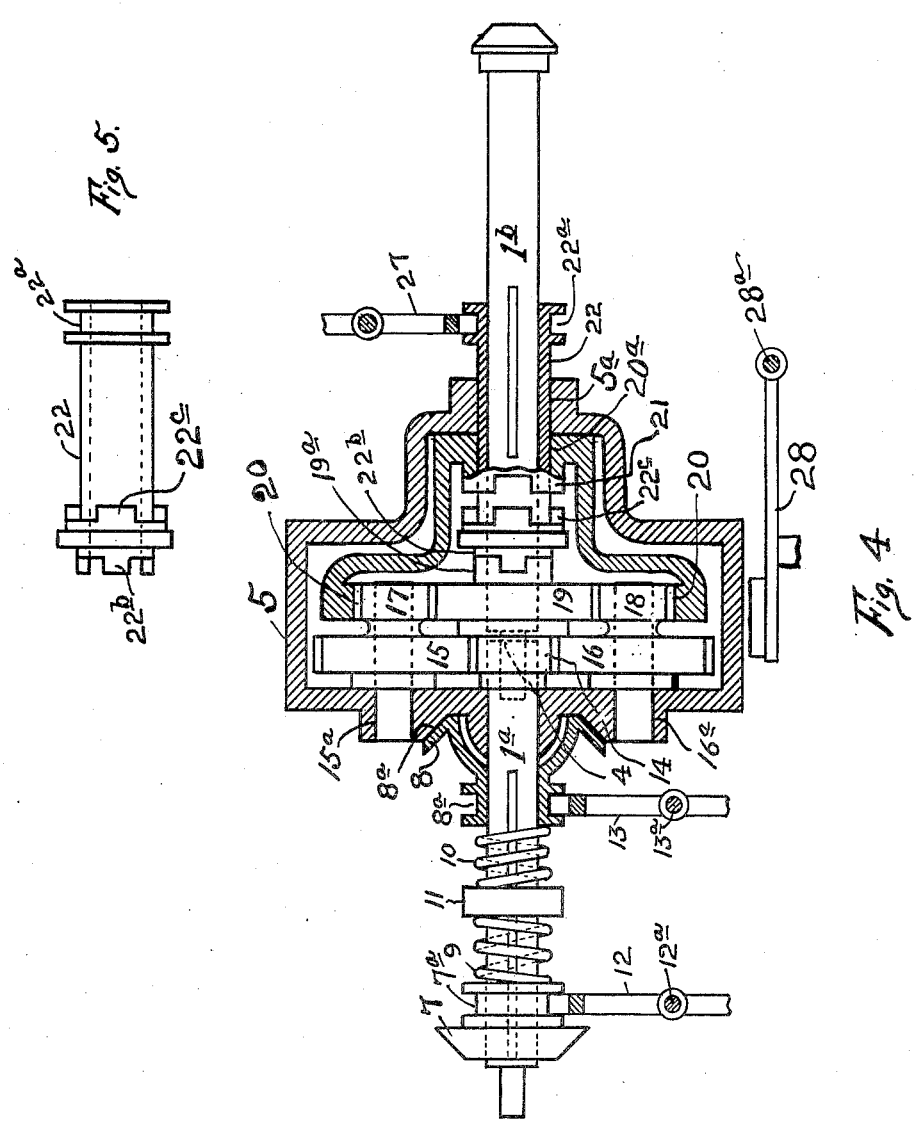

UNITED STATES PATENT OFFICE.

MERION J. HUGGINS, OF NEW YORK, N. Y.

AUTOMOBILE-SPEED-CONTROL MECHANISM.

1,357,563.  Specification of Letters Patent.  Patented Nov. 2, 1920.

Application filed March 19, 1917. Serial No. 155,696.

*To all whom it may concern:*

Be it known that I, MERION J. HUGGINS, a citizen of the United States, and a resident of the city of New York, in the county of Kings and State of New York, have invented certain new and useful Improvements in Automobile-Speed-Control Mechanism, of which the following is a specification.

This invention relates to driving and speed controlling mechanism particularly suitable for use with automobiles, and it is an object of this invention to provide simple, reliable, efficient and more conveniently operated means for driving the automobile at variable speeds and reverse.

Other objects and advantages will hereinafter appear.

Figure 1 is a general sectional view of this driving and controlling mechanism as adapted to an automobile.

Fig. 2 is a sectional view of the driven gear 19.

Fig. 3 is a sectional view of the reversing gear 23.

Fig. 4 is a sectional view of a modification of the variable gear part of this driving and controlling mechanism.

Fig. 5 is a view of the sleeve 20 in Fig. 4.

The drive shaft 1 driven by the prime mover 2 is split from a continuing driving shaft section $1^a$ at 3, the shaft section $1^a$ is split from a continuing driven shaft section $1^b$ at 4 within the rotatable support 5 adapted to rotate on a shaft section and forming a support for members of a gear train adapted to turn in their axes on said support as will be presently described. Preferably said support is formed to constitute a casing or housing for the gears mounted thereon or suitably supported therein as will be set forth. These shaft sections are all in axial alinement. The driven shaft $1^b$ is in drive connection through gearing with the traction wheels 6, and is what is technically known as the propeller shaft.

The driving shaft section $1^a$ carries two clutch elements 7, 8 forming elements of a clutch operating preferably by friction that are splined thereto and rotatable therewith and adapted to be shifted thereon in and out of contact with coöperating elements or surfaces $7^a$, $8^a$. Clutch element 7 connects the driving shaft section $1^a$ to drive shaft 1 and prime mover 2, and clutch element 8 connects shaft section $1^a$ to the rotatable gear casing 5. These clutch elements 7, 8 are kept in spring pressed engagement with their respective coöperating surfaces by means of springs 9, 10 held in position by a solid collar 11. Each clutch element has a grooved collar $7^b$, $8^b$ to receive the bifurcated ends of levers 12, 13 fulcrumed at $12^a$, $13^a$. These levers 12, 13 when actuated about their fulcrums move their respective clutch elements 7, 8 out of engagement with their respective coöperating surfaces and permit said elements to be reëngaged through the action of springs 9, 10, whereby the driving shaft section $1^a$ is connected to and disconnected from drive shaft 1 and prime mover 2, and whereby shaft section $1^a$ is connected to and disconnected from the rotatable gear casing 5, or whereby shaft section $1^a$ is connected to and disconnected from both the prime mover and casing 5 simultaneously.

The driving shaft section $1^a$ extends to and within the variable gear casing 5, which comprises a rotatable casing 5 containing a driving gear 14 fixed to shaft section $1^a$ and in constant mesh with transmission gears 15, 16 supported in or on the casing by bearings $15^a$, $16^a$. Fixed to these transmission gears 15, 16 to rotate therewith about the same axis and to be driven therewith and thereby are transmission gears 17, 18, the latter being preferably of smaller diameter, preferably in constant mesh with a driven gear 19 rotatably mounted upon the driven shaft section $1^b$ within said casing 5. This driven gear 19 is formed with a sleeve 20 (shown partly cut away) surrounding the shaft $1^b$ and terminating in a flange 21 upon which is formed external teeth or projections for coöperation with internal teeth or projections upon another member to form a jaw clutch as will be presently described (Fig. 2). This rotatable gear casing 5 also contains a reversing gear 23 (Fig. 3) mounted co-axially with the driven shaft $1^b$ and adapted to be rotated by meshing with the rotatable gear 17 of the train of gears for reversing the rotation of the shaft section $1^b$. Said gear may be operatively connected with the shaft section $1^b$ by a spline and moved or shifted axially to bring it into and out of mesh with the gear 17 or may remain in mesh therewith after the manner described in connection with Fig. 4 and be operably connected to the shaft by a shiftable element which couples them together. In Fig. 1 it is shown as having its hub 24 splined to and shiftable upon the driven shaft section 1ᵇ and having an interior annular chamber 25 of greater diameter than the diameter of the gear toothed flange 21 on sleeve 20. The circular opening leading into this chamber 25 has internal gear teeth 26 formed thereon and adapted to mesh with the teeth on flange 21 to form the other element of a jaw clutch operating with the teeth or projections 21. Thus when gears 19, 23 are in the relative position shown the external teeth on flange 21 and the internal teeth 26 on reverse gear 23 are intermeshed and the driving gear 19 is thereby locked to the driven shaft 1ᵇ through the jaw clutches 21 and 26 and sleeve or hub 24 of gear 23 splined to the shaft 1ᵇ as already stated. The hub or sleeve 24 extends out through bearing 5ª and terminates outside the rotatable casing 5 in the form of a grooved collar. The bifurcated end of a lever 27 fulcrumed at 27ª rests within this grooved collar. The lever 27 is provided for shifting the reverse gear 23 backward and forward on shaft 1ᵇ.

Connecting the rotatable gear casing or support 5 to the driving shaft section 1ª, or vice versa, by means of clutch element 8 prevents the driving gear 14 from rotating within said casing and causes it to rotate with the casing, or in other words causing the casing 5 and gear 14 to rotate together, and likewise prevents transmission gears 15, 16, 17, 18 from rotating about their own axes which in turn prevents gear 19 from rotating about its axis and causes it to rotate with the casing 5, whereby when the rotatable casing 5 is thus locked to the drive shaft section 1ª and the gears 14, 15, 16, 17, 18, 19 thus prevented from rotating about their respective axes, shaft sections 1ª and 1ᵇ will be forced to rotate together at like speed, and what is termed high speed or direct drive will thus be secured. But if shaft section 1ª be disconnected or unlocked from the rotatable casing 5 and the rotatable casing 5 locked against rotation by brake lever 28 or by other suitable means, the driving gear 14 will then be free to revolve in said casing and will cause gears 15, 16, 17, 18 to rotate about their axes and thereby and therethrough drive driven gear 19 and shaft section 1ᵇ at low speed.

The lever 27 is shown as provided for convenience of operation with an indicating quadrant 27ᵇ and in position "D" or forward drive position and when in this position driven gear 19 will be locked to shaft section 1ᵇ through the teeth of its flange 21 being intermeshed with the internal teeth 26 on reverse gear 23. When the lever 27 is moved to position "N" or neutral, the reverse gear 19 will be moved to the left far enough for the teeth on flange 21 to be disengaged from internal teeth 26 on gear 23 and to be positioned inside the chamber 25 whereby gear 19 will be unlocked from shaft section 1ᵇ and there will be no drive connection between the prime mover and variable speed gear mechanism and the traction wheels 6. By moving lever 27 to position "R," the gear 23 will be moved still farther to the left and meshed with transmission gears 17, 18 and the traction wheels will thereby be driven in the reverse direction.

Automobiles as at present constructed are equipped with what is known as a clutch pedal for controlling a friction clutch that is provided for connecting the prime mover to the traction wheels, and it is proposed to operate this variable speed and control mechanism through connection with this clutch pedal or similar operating device or lever, and to connect the operating lever or pedal to the prime mover clutch and to this speed mechanism in such a manner that they will co-act to produce the actions hereinafter described.

The operating lever or other device 29 fulcrumed at 29ª represents the regulation clutch pedal, above referred to, and may be connected to this speed mechanism through a cam rod 30 mounted in bearing blocks 30ª, 30ᵇ and having cams 31, 32 adapted to actuate the levers 12, 13 and having also an elongated slot 33 to actuate lever 12 through the pin 12ᵇ.

Swinging the pedal 29 to the left moves the cam rod 30 to the left whereby the cam 31 is passed under the roller equipped end of clutch lever 13 to disengage clutch element 8 from its coöperating surface on the rotatable casing 5, and thus unlocks the driving shaft 1ª from the casing 5. Simultaneously cam 32 is passed under roller equipped boss on brake lever 28, fulcrumed at 28ª, causing brake lever 28 to move (against spring 28ᵇ) toward and engage with the surface of the rotatable casing 5 and arrest the rotation of said casing. Simultaneously the elongated slot 33 will have moved to the left until its rear wall 33ª engages the pin 12ᵇ on lever 12. By holding the pedal 29 in this position, against the pull of spring 34, with casing 5 locked against rotation and with gears in the position shown in drawing, the prime mover will drive the traction wheels at low speed through shaft section 1ª, driving gear 14, transmission gears 15, 16, 17, 18, driven gear 19 and shaft section 1ᵇ. If pedal 29 were to be here released and cam rod 30 moved to the right, the cams 31, 32 would move out of contact with levers 13, 28 whereby the brake would be released from casing 5 to permit its rotation and the spring 10 would operate to engage clutch elements 8 with casing 5 to lock casing 5 to shaft section 1ª when shaft sections 1ª, 1ᵇ would revolve at like speed and the drive would be high speed or direct. Thus a change in speed from high to low and from low to high would have been secured without at any time disconnecting the prime mover from shaft section 1ª. But if pedal 29 were here swung farther to the left, or to the limit of its forward throw, the lever 12 would be swung about its fulcrum and disengage clutch element 7 from its coöperating element and disconnect shaft section 1ª from drive shaft 1 and prime mover 2, when there would be no drive connection between the prime mover and the traction wheels 6.

Presuming that the pedal 29 has been so swung to its extreme left position to disconnect shaft section 1ª from the prime mover for the purpose, we will say, of completely stopping the automobile, upon releasing the pedal 29 to permit it to swing to the right and to permit cam rod 30 to move to the right, the co-action of the mechanism would be as follows: First, the clutch element 7 would be engaged with its coöperating element by the spring 9 whereby shaft section 1ª would be connected to the prime mover 2, while the brake lever 28 resting on cam 32 would still arrest rotation of the casing 5 and therefore the prime mover would drive the traction wheels at low speed through the train of gearing as heretofore described. The pedal, cam rod and levers could be held in this position until the vehicle was sufficiently accelerated when by completely releasing the pedal 29 cam 32 would move out of contact with brake lever 28 releasing the brake on casing 5 to permit rotation thereof, and cam 31 would simultaneously move out of contact with clutch lever 13 and permit spring 10 to reëngage clutch element 8 with casing 5 and lock casing 5 to driving shaft section 1ª, when shaft sections 1ª and 1ᵇ would rotate at like speed and the prime mover would drive the traction wheels through this variable speed mechanism at high speed or direct.

When it is desired to reverse the motion of the traction wheels, the clutch pedal 29 would be swung to its extreme left position, and in being so swung would operate the cam rod 30 to unlock shaft section 1ª from casing 5, to lock casing 5 against rotation and to disengage shaft 1ª from the prime mover 2, whereupon lever 27 would be moved to position "R" and reverse gear 23 meshed with transmission gears 17, 18. After gear 23 has been so meshed, the clutch pedal 29 is released sufficiently to permit spring 9 to reëngage clutch element 7 to connect shaft 1ª to the prime mover 2, and since cam 32 will still be in contact with brake lever 28 and casing 5 thereby locked against rotation, the prime mover will drive the traction wheels in reverse direction through shaft section 1ª, driving gear 14, transmission gears 15, 16, 17, 18, reverse gear 23 and shaft section 1ᵇ.

If, while reverse gear 23 is in mesh with transmission gears 17, 18, the clutch pedal 29 is completely released, the brake lever 28 will operate to release the casing 5 and permit rotation thereof and clutch lever 13 will operate to permit clutch element 8 to reengage and lock shaft 1ª and casing 5 together, when the prime mover would propel the vehicle forward at high speed, and, therefore, where it is necessary to alternately reverse and go forward, as, for instance, in turning the vehicle around, all that is necessary while reverse gear 23 is in mesh is to move the clutch pedal 29 backward and forward, which will result in the vehicle being driven alternately backward and forward without at any time having actually disconnected the driving mechanism and shaft sections from the prime mover.

The modification shown in Fig. 4 is in general principle the same as the previously described device, in that it comprises a driving shaft 1ª which is split from a continuing driven shaft section 1ᵇ at 4 within the rotatable casing 5. These two shaft sections are in axial alinement and the driven shaft section 1ᵇ is adapted to be put in fixed drive connection with the automobile traction wheels 6 (Fig. 1).

The driving shaft section 1ª carries two friction clutch elements 7, 8, that are splined to and rotatable with this shaft section and adapted to shift thereon in and out of contact with coöperating elements or surfaces (7ª Fig. 1) and 8ª Fig. 4. Clutch element 7 connects the driving shaft section 1ª to shaft 1 and prime mover 2 (Fig. 1) and clutch element 8 connects the shaft section 1ª to rotatable casing 5. These clutch elements are kept in contact with their respective coöperating surfaces by means of springs 9, 10 held in position by a solid collar 11. These clutch elements have grooved collars 7ᵇ, 8ᵇ to receive the bifurcated end of levers 12, 13 fulcrumed at 12ª, 13ª. These levers when actuated about their fulcrums move their respective clutch elements 7, 8 out of engagement with their coöperating surfaces and permit said elements to reëngage through the action of springs 9, 10, whereby shaft section 1ª is connected to and disconnected from the prime mover, and whereby shaft section 1ª is connected to and disconnected from the rotatable casing 5.

The driving shaft section 1ª extends to and within the variable gear casing, which comprises a rotatable casing or support 5 containing a driving gear 14 fixed to shaft section 1ª and in constant mesh with transmission gears 15, 16 having bearings 15ª, 16ᵃ. Fixed to these transmission gears 15, 16 to rotate therewith about the same axis and to be driven therewith and thereby are transmission gears 17, 18, of smaller diameter, in constant mesh with a driving gear 19 rotatably mounted upon shaft section 1ᵇ. There is also provided a reversing gear 20 in constant mesh with transmission gears 17, 18. This reversing gear 20 is of the internal gear type and has a jaw clutch element 21 formed on the interior face of its rear wall. A sleeve 22 having a grooved collar 22ᵃ extends into this rotatable casing through bearing 5ᵃ of casing 5, bearing 20ᵃ and jaw clutch 21 of reversing gear 20, and within the casing there is formed upon this sleeve 22 a jaw clutch element 22ᵇ adapted to engage with a coöperating jaw clutch element 19ᵃ formed on the driven gear 19. Said sleeve also has a jaw clutch element 22ᶜ adapted to engage with the jaw clutch element 21 formed on reversing gear 20. This sleeve 22 is shiftable upon driven shaft 1ᵇ and splined thereto and is actuated back and forth by the lever 27.

With the jaw clutch elements 22ᵇ and 19ᵃ engaged as shown in the drawing Fig. 4, the driven gear 19 will be connected with the driven shaft section 1ᵇ through sleeve 22, but if sleeve 22 is moved sufficiently to disengage jaw clutch elements 22ᵇ, 19ᵃ, but not sufficiently to engage jaw clutch elements 22ᶜ, 21, sleeve 22 with its jaw clutch elements 22ᵇ, 22ᶜ will be in neutral and both the driven gear 19 and reversing gear 20 will be disconnected from the driven shaft section 1ᵇ, whereas, if the sleeve 22 were moved sufficiently to engage jaw clutch elements 22ᶜ, 21, the reversing gear 20 would be connected to shaft section 1ᵇ and shaft section 1ᵇ would be thereby driven in the reverse direction. A brake lever 28 is likewise provided to arrest rotation of the rotatable gear casing 5 and the operation is essentially the same as heretofore described of Fig. 1.

Wherever possible parts that are similar or serve a similar purpose are numbered the same in both Fig. 1 and Fig. 4. As above stated the operation is essentially the same in both types of mechanism, with the exception that the reverse gear in Fig. 4 is in constant mesh with the transmission gears and the operation of setting the reverse gear to drive reverse is that of locking it to shaft 1ᵃ.

Variations may be resorted to within the scope of this invention and portions may be used without others.

Having thus described my invention, I claim:

1. A driving and speed controlling mechanism for automobiles comprising a driving shaft section driven by a prime mover, a driven shaft section in drive connection with the traction wheels, a rotatable gear casing interposed between said shaft sections, a train of gears mounted therein in constant mesh for driving the driven shaft section, forwardly by rotation of said gears on their own axes at a speed less than that of the driving shaft section when the casing is locked against rotation, means for locking said casing to one of said shaft sections so that it will rotate therewith to drive the driven shaft at speed the same as that of the drive shaft forwardly, the gears being retained in mesh and means for locking said casing against rotation to drive said shaft forward at lower speed.

2. A driving and speed controlling mechanism for automobiles, comprising a driving shaft section in clutched drive connection with the prime mover, a gear fixed on said driving shaft section, a driven shaft section in drive connection with the traction wheels, a rotatable gear casing interposed between said shaft sections containing a train of gears in constant mesh with the gear upon the driving shaft section and adapted by rotation on their own axes to drive one shaft section at a speed different from the driving speed of the other shaft section, said casing being adapted to be locked to one of said shaft sections to drive the other shaft section at like speed and to be locked against rotation to drive one shaft section at speeds variable to the driving speed of the other shaft section, and a reverse gear meshing with the rotating member of the gear train while the casing is locked against rotation to drive one shaft section in direction opposite to the rotative direction of the driving shaft section and without shifting of the gear train employed in the forward drive.

3. A driving and speed controlling mechanism for automobiles, comprising a driving shaft adapted to be clutched to and unclutched from the prime mover, a driven shaft in drive connection with the traction wheels, a rotatable gear casing and train of gears interposed between said shafts, means to arrest the rotation of said casing to drive the driven shaft and traction wheels at variable speeds and reverse through said train of gears, means to lock said casing to one of said shafts to drive the other shaft at like speed, both said means being actuated by a pedal or lever provided to operate the clutching means between the prime mover and driving shaft, to drive the traction wheels at variable speeds and reverse.

4. A driving and speed controlling mechanism for automobiles, comprising a driving shaft section and a clutch to connect it to and disconnect it from the prime mover, a driven shaft section in drive connection with the traction wheels, a rotatable gear casing containing a train of gears, said casing being adapted to connect said shafts together through the train of gears and thereby drive one shaft at speeds variable to the other or in opposite direction, and to connect said shafts together through the casing and gears to cause said shafts to rotate at like speed, means to effect the connection of said shafts through said train of gears or through said casing and gears, said means being operable by a clutch pedal provided for operating the mechanism for connecting and disconnecting the driving shaft and prime mover, to drive the traction wheels at variable speeds and reverse.

5. A driving and speed controlling mechanism for automobiles, comprising a driving shaft section and a clutch to connect it to and disconnect it from the prime mover, a driven shaft section in drive connection with the traction wheels, a rotatable casing and train of gears, means to connect the driving shaft to the driven shaft through the train of gears, means to connect the driving shaft to the driven shaft through the casing, said means being operable by a pedal adapted to actuate the clutching mechanism for connecting and disconnecting the prime mover to and from the driving shaft when said pedal is partially operated or actuated, to drive the automobile traction wheels at variable speeds and reverse.

6. A driving and speed controlling mechanism for automobiles, in combination with a prime mover, driving shaft section, driven shaft section and traction wheels, comprising a rotatable casing and a train of constantly meshed gears, pedal operated means to disconnect the prime mover from and connect it to the driving shaft, means operable by said pedal when pedal is partially or fully operated to arrest rotation of said casing to cause the gears therein to rotate about their axes and drive the driven shaft at speeds variable to, or in opposite direction to, the speed and direction of the driving shaft, and means operable by said pedal to lock the gears in said casing against rotation about their axes to drive the driven shaft at the speed of the driving shaft, to drive the traction wheels at variable speeds and reverse.

7. A driving and speed controlling mechanism for automobiles, comprising a driving shaft section adapted to be put in and out of drive connection with the prime mover, a clutching mechanism between the prime mover and said driving shaft section, driven shaft section in drive connection with the traction wheels, a rotatable gear casing containing a set of constantly meshed gears, said casing being adapted to be connected to one of said shafts to lock said gears against rotation about their axes, said casing being adapted to be locked against rotation, means to connect said casing to one of said shafts and lock said gears against rotation, means to operate the prime mover and driving shaft clutching mechanism, said means also actuating the means to connect said casing to one of said shafts and lock said gears against rotation to cause the driving and driven shafts to rotate together at like speed, and to actuate means to lock said gear casing against rotation to cause the driving shaft to drive the driven shaft through the set of gears at speeds variable thereto and a reversing gear meshing with a gear of said train and operatively connected to the driven shaft while the casing is locked to reverse the drive of the friction wheels.

8. In an automobile, the combination with a prime mover and traction wheels, of a rotatable gear casing containing a driving and driven gear and transmission gears in constant mesh therewith to drive the traction wheels through the driven gear, a reverse gear locked to the driven shaft and adapted to lock the driven gear to and unlock it from the driven shaft to drive said shaft in one direction and to be meshed with the transmission gears to drive said shaft in opposite direction and to be placed in neutral position with driven shaft out of drive connection with the transmission gears, to drive the traction wheels at speeds the same or variable to the speed of the prime mover by said casing being locked to one of said shaft sections to rotate therewith and by said casing being locked against rotation to permit said shaft sections to rotate therein.

9. In an automobile, the combination with a prime mover, driving and driven shafts and automobile traction wheels, of a rotatable gear casing containing a driving, a driven and a reversing gear and transmission gears in constant mesh therewith, means to lock the driven gear or the reversing gear to the driven shaft or unlock the same, means to control said gears and said gear casing whereby when casing revolves the shafts will rotate at like speed in the same direction, and whereby when transmission gears revolve about their axes and casing is arrested against rotation the driven shaft will rotate at a speed lower than that of the driving shaft in the same direction, or in an opposite direction, to drive the traction wheels at variable speeds and reverse.

10. In an automobile, the combination of a prime mover, driving and driven shafts and traction wheels, of a rotatable gear casing containing driving and driven gears and transmission gears in constant mesh therewith, said rotatable casing being adapted to be locked to the driving shaft, said rotatable casing being adapted to be locked against rotation, a clutch between the driving shaft and prime mover, a foot pedal to operate said clutch, means operable by said pedal to lock said casing to the driving shaft, means operable by said pedal to arrest rotation of said casing, said pedal operating said means so as to first arrest the rotation of said casing and simultaneously unlock said casing from the driving shaft and then disconnect the driving shaft from the prime mover when pedal is actuated in one direction, and said pedal operating said means so as to first connect the driving shaft to the prime mover while casing is locked against rotation then release casing to permit rotation thereof and simultaneously lock casing to driving shaft when pedal is actuated in an opposite direction, to drive the automobile traction wheels at variable speeds and reverse.

11. In an automobile, a driving and speed controlling mechanism, having the combination of a driving shaft adapted to be put in and out of driving connection with the prime mover, a driven shaft in drive connection with the traction wheels, a rotatable gear casing containing a driving gear, a driven gear and transmission gears in constant mesh therewith, a reversing gear meshing with a gear of said transmission gears, means to connect the driven or reversing gear to the driven shaft, or disconnect the same at will, means to lock the rotatable casing to the driving shaft, means to lock the rotatable casing against rotation for the purpose of driving the traction wheels at variable speeds and reverse.

12. A driving and speed controlling mechanism comprising a drive shaft and a driven shaft each provided with a gear, intermediate gears meshing therewith and forming in connection therewith a train of gears for operating the driven shaft at less speed than the drive shaft, a rotatable member or element carrying said intermediate gears and rotatable idly on its own axis by the action of the gear on the drive shaft when said member is free, the intermediate gear remaining at such time in mesh with the gear on the driven shaft, means for arresting the rotation of said member to operate the driven shaft at less speed than the drive shaft through said gear train, means for locking the members of the gear train against relative rotation on their own axes to cause the drive and driven shafts to rotate at synchronous speeds by direct drive and a reverse gear meshed with a rotating member of said train while the casing is held from rotation, to drive the automobile traction wheels at variable speeds and reverse.

13. In combination with a prime mover and automobile traction wheels, two shaft sections in axial alinement, a rotatable gear support and train of gears interposed between said shaft sections, a clutch between one of said shaft sections and the prime mover, means to operate said clutch, means operatively connected to said clutch operating means to arrest rotation of said support in one direction of said clutch operating means to drive one of said shaft sections through said transmission gears at a speed different from the other or reverse, and to arrest rotation of said gears about their axes in another position of said clutch operating means to drive said shaft sections at like speed.

14. A variable gear and speed control mechanism for automobiles, having the combination of a driving shaft adapted to be put in and out of driving connection with the prime mover, a driven shaft in drive connection with the automobile traction wheels, a variable gear mechanism interposed between the driving and driven shafts, said mechanism comprising a rotatable casing containing a driving gear, a driven gear, a reverse gear in constant mesh with transmission gears normally locked against rotation about their axes, an operable lever to connect and disconnect the driving shaft from the prime mover, said lever when operated its full stroke in one direction successively operates to, first, free the transmission gears to permit their rotation, second, to arrest rotation of the casing, third, to disconnect the driving shaft from the prime mover, and when operated its full stroke in the opposite direction successively operates to, first, connect the driving shaft to the prime mover while casing is still maintained in non-rotatable state, second, releases casing to permit rotation thereof, third, arrest the rotation of the transmission gears, for the purpose of stopping and starting the automobile and driving same at variable speeds and reverse.

15. In an automobile, the combination with a prime mover, driving and driven shafts and traction wheels, of a variable speed gear and control mechanism substantially as set forth in the annexed specification and drawings, said gear mechanism comprising a rotatable casing with driving, driven, reverse and transmission gears in constant mesh therewith and wherein when all gears revolve within their bearings and about their respective axes the driving shaft drives the driven shaft through said gearing either forward or reverse, and wherein when all gears are prevented from revolving within their bearings the driving shaft drives the driven shaft direct, to drive the automobile at variable speeds and reverse.

16. A driving and speed controlling mechanism for automobiles comprising a driving shaft, a driven shaft, a rotatable gear support interposed between said shafts and having a train of gears for driving the one shaft from the other at speeds the same as and variable to the speed of the driving shaft section by said support being locked to one of said shaft sections to rotate therewith and by said support being locked against rotation to permit said shaft sections to rotate therein and an operating lever, means operably connected with said operating lever for unlocking the support from one of said shaft sections and at the same time locking it against rotation and vice versa on the reverse movement of said operating lever.

17. A driving and speed controlling mechanism comprising a drive shaft and a driven shaft each provided with a gear, intermediate gears meshing therewith and forming in connection therewith a train of gears for operating the driven shaft at less speed than the drive shaft, a rotatable member or element carrying said intermediate gears and rotatable idly by the action of the gear on the drive shaft when said member is freed and while the intermediate gear remains in mesh with the gear on the driven shaft, means for arresting the rotation of said member to cause the driven shaft to be operated forwardly at less speed than the drive shaft through the gear train, means for connecting the rotatable member to one of said shafts to cause rotation of said member synchronously with the drive shaft and a direct drive of the driven shaft at synchronous speed and a reverse gear meshing with the rotating member of the gear train while the gear carrying member is locked to reverse the driven shaft.

18. In a driving and speed controlling mechanism, the combination of a drive shaft, a rotatable support, gears mounted on and rotatable on their own axes on said support, a drive gear on the drive shaft meshing with said gears, a driven gear meshed with said gears to drive the driven shaft in the same direction as the drive shaft but at a speed less than that of the drive shaft by rotation of the gears on their own axes while the support is locked against rotation, means for locking said support against rotation and for freeing the same at will and means for locking said gears against relative rotation to cause the drive shaft to rotate the driven shaft directly at synchronous speed.

19. A driving and speed controlling mechanism for automobiles, comprising a drive shaft, a driven shaft, a rotatable gear casing rotatable coaxially with said shafts and carrying a train of gears interposed between the said shafts to drive at a less speed than the drive shaft, means to arrest the rotation of said casing to drive the driven shaft through the train of gears, means to lock said casing to one of said shafts to drive the other shaft at like speed without shifting a gear of the gear train and in the same direction, and a common actuating lever for both said means operating thereon when the lever is released to free the one and bring the other into action to drive the driven shaft at variable speeds according to the position of said lever.

20. In an automobile, a driving and speed controlling mechanism, having in combination a driving shaft adapted to be put in and out of driving connection with the prime mover, a driven shaft in drive connection with the traction wheels, a rotatable gear support, a driving gear, a driven gear and transmission gears in constant mesh therewith, a reversing gear meshing with a gear of said transmission gears, means to connect the driven or reversing gear to the driven shaft or disconnect the same at will, means to lock the rotatable support to the driving shaft, and means to lock the rotatable support against rotation for the purpose of driving the traction wheels at variable speeds and reverse.

21. A driving and speed controlling mechanism comprising a drive shaft, a rotatable support, reduction gears mounted on and rotatable on said support, a drive gear on the drive shaft meshing with said reduction gears, a driven gear constantly meshed with the reduction gear and rotatably mounted for free rotation on the driven shaft, means for coupling and uncoupling the same from the driven shaft and a reversing gear shiftable into and out of mesh with the reduction gear.

22. A driving and speed controlling mechanism comprising a drive shaft, a rotatable support, reduction gears mounted on and rotatable on said support, a drive gear on the drive shaft meshing with said reduction gears, a driven gear constantly meshed with the reduction gear and rotatably mounted for free rotation on the driven shaft, means for coupling and uncoupling the same from the driven shaft and a reversing gear shiftable into and out of mesh with the reduction gear and provided with means for interlocking it with the said driven shaft.

23. A driving and speed controlling mechanism comprising a drive shaft, a rotatable support, reduction gears mounted on and rotatable on said support, a drive gear on the drive shaft meshing with said reduction gears, a driven gear constantly meshed with the reduction gear and rotatably mounted for free rotation on the driven shaft, means for coupling and uncoupling the same from the driven shaft and a reversing gear shiftable into and out of mesh with the reduction gear and means for locking the support against rotation while the reverse gear is meshed.

24. A driving and speed controlling mechanism comprising a drive shaft and a driven shaft, a support rotatable co-axially with the drive shaft and carrying the elements of a reduction gear, a driven gear constantly meshed with the reduction gear and rotable co-axially with the driven shaft independently thereof, a reversing gear axially adjustable on the driven shaft into and out of mesh with the reduction gear and means for locking and unlocking said driven shaft from said driven gear.

Signed at the city of New York, in the county of Kings and State of New York, this seventeenth day of March, A. D. 1917.

MERION J. HUGGINS.

Witnesses:
S. A. ORTLIEB,
A. M. HUGGINS.